United States Patent [19]

Tabata

[11] 4,409,538

[45] Oct. 11, 1983

[54] CHARGE CONTROL CIRCUIT

[75] Inventor: Junichi Tabata, Tokyo, Japan

[73] Assignee: Kabushiki Kaisha Daini Seikosha, Tokyo, Japan

[21] Appl. No.: 284,345

[22] Filed: Jul. 17, 1981

[30] Foreign Application Priority Data

Aug. 27, 1980 [JP] Japan ............................... 55-117885

[51] Int. Cl.³ .......................................... H01M 10/46
[52] U.S. Cl. ..................................... 320/11; 320/40; 340/636; 368/205
[58] Field of Search ........................... 320/11, 39, 40; 368/205; 340/636

[56] References Cited

U.S. PATENT DOCUMENTS

| | | | |
|---|---|---|---|
| 3,979,656 | 9/1976 | Takeda et al. | 320/2 |
| 4,043,110 | 8/1977 | Chihara | 340/636 X |
| 4,266,178 | 5/1981 | Asakawa | 320/39 |
| 4,301,380 | 11/1981 | Thomas | 340/636 X |
| 4,311,953 | 1/1982 | Fukuda et al. | 320/40 X |
| 4,316,275 | 2/1982 | Tabata | 368/204 X |

FOREIGN PATENT DOCUMENTS 54-46352  4/1979  Japan ................... 323/273

*Primary Examiner*—William M. Shoop
*Attorney, Agent, or Firm*—Robert E. Burns; Emmanuel J. Lobato; Bruce L. Adams

[57] ABSTRACT

A charge control circuit has an excess charge detecting circuit for preventing the excess charge of a secondary battery responsive to the voltage of the secondary battery, and a switching circuit responsive to the output of the excess charge detecting circuit. The switching circuit and the excess charge detecting circuit are operated by the electromotive force of a solar cell without the power dissipation of the secondary battery.

2 Claims, 3 Drawing Figures

4,409,538

CHARGE CONTROL CIRCUIT

BACKGROUND OF THE INVENTION

The present invention relates to a charge control circuit for electronic instruments provided with a power device such as a solar cell and secondary batteries.

Conventional micro portable electronic instruments such as electronic wristwatches and computers employ micro silver-zinc batteries as energy sources, and it is necessary to exchange the batteries whenever the one or two year-battery life is over since the battery capacities of such batteries are small.

Accordingly, in order to reduce the need for exchanging batteries, methods for elongating the battery lives have been studied; one method being to elongate the battery life by combining the power devices such as solar cells with the secondary batteries and supplying energy from the former to the latter.

The silver-battery can be used as the secondary battery because it has the following features:
1. small size
2. excellent charge efficiency
3. small self-discharge characteristic Although the silver-zinc battery has the features suitable for the secondary battery as illustrated above, it is necessary to select the charge conditions in order to utilize these features effectively.

In charging, for instance, if the secondary battery reaches an excess charge condition, gas is generated inside the battery and exceedingly dangerous conditions such as an expansion of the battery or, in an extreme case an explosion of the battery may take place.

The excess charge condition is easily detected by observing the terminal voltage of the secondary battery. When the silver-zinc battery becomes in the excess charge condition, the terminal voltage exceeds the normal 1.57 volts. It has been confirmed by experiment that a gas generates inside the battery when the terminal voltage is raised to approximately 1.8 volts. Accordingly, the efficient, reliable and safe charging system is completed by a charge control circuit which stops the charging when the terminal voltage of the silver-zinc secondary battery reaches 1.8 volts.

SUMMARY OF THE INVENTION

Accordingly, it is an object of this invention to provide a highly efficient charge control circuit for solving the above mentioned problem.

It is another object of this invention to provide a charge control circuit which comprises an excess charge detecting circuit operated by the electromotive force of a power device without power dissipation of a secondary battery.

It is still another object of this invention to provide a charge control circuit comprising a power device for producing an electromotive force, an excess charge detecting circuit for preventing the excess charge of a secondary battery, a charge changeover circuit responsive to an output of the excess charge detecting circuit and a secondary battery charged by the electromotive force of the power device, wherein the excess charge detecting circuit is connected to the changeover circuit, is responsive to the secondary battery voltage and is operated by the electromotive force of the power device.

BRIEF DESCRIPTION OF THE DRAWINGS

The nature, objects and advantages of the invention will be more fully understood from the following description of preferred embodiments in conjunction with the accompanying drawings in which.

DESCRIPTION OF PREFERRED EMBODIMENTS

Hereinafter the present invention will be illustrated in conjunction with the accompanied drawings.

Figure 1:
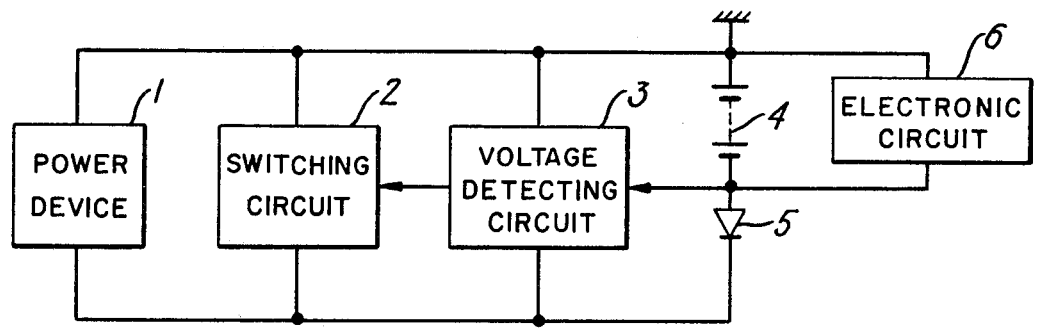
FIG. 1 shows a block diagram of a charge control circuit according to the present invention.

FIG. 1 is a block diagram of a charge control circuit according to the present invention. Reference numeral 1 denotes a power device such as a solar cell, a positive terminal of which is connected to an anode of a solar cell 4 and a negative terminal of which is connected to a cathode of a reverse-current preventing diode 5. A negative terminal of the secondary battery 4 is connected to an anode of the reverse-current preventing diode 5. A voltage detecting circuit 3 is connected in parallel with to the power device 1 and a voltage signal is applied from the cathode of the secondary battery 4 to the voltage detecting circuit 3 and an output signal from the circuit 3 is fed to a switching circuit 2. The switching circuit 2 is connected in parallel with the power device 1.

Now the circuit operation will be explained.

The secondary battery 4 is charged by the power device 1, and an electric circuit 6 operates by using the energy charged in the secondary battery 4 and the circuit 6 comprises, for example an electronic instrument. In the case the electromotive power of the power device is deteriorated, a current in the secondary battery cannot flow in the reverse direction to the power device 1 due to the reverse-current preventing diode 5.

The voltage detecting circuit 3 detects the terminal voltage of the secondary battery 4. When the voltage detecting circuit 3 detects the terminal voltage to reach a predetermined voltage value, the output signal therefrom changes and the switching circuit 2 is controlled to be in a conducting condition. The switching circuit 2 is normally in a non-conducting condition and starts conduction when an excess charging is detected and the switching circuit 2 by-passes the whole charging current in order to stop the charging and thereby prevent the excess charging. If the terminal voltage is lower than the detection voltage value by the discharge of the secondary battery after the charge is stopped, the output signal of the voltage detecting circuit 3 changes and the switching circuit 2 returns to the non-conduction state in the normal condition, and the charging starts again.

Figure 2:
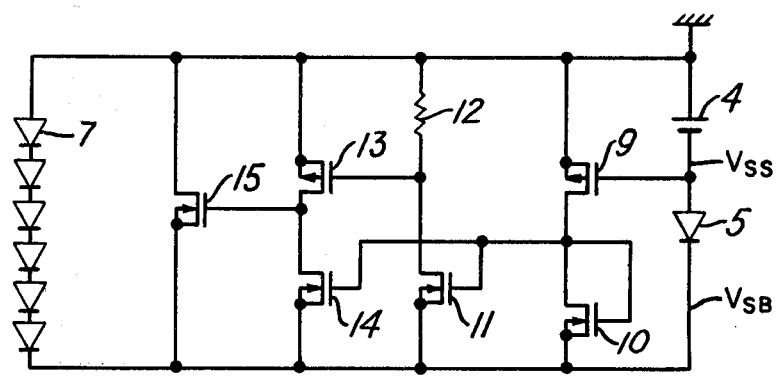
FIG. 2 shows an embodiment of the charge control circuit according to the present invention.

FIG. 2 shows an embodiment of a charge control circuit according to the present invention. In this embodiment a solar cell 7 such as Si, GaAs or the like is employed by way of an example of the power device. The positive terminal of the secondary battery 4 is grounded and the negative terminal thereof is connected to the anode of the reverse-current preventing diode 5.

The cathode of the reverse-current preventing diode 5 is connected to a positive terminal of the solar cell 7.

A voltage detecting circuit comprises P channel MOSFETS (referred to as PMOS hereafter) 9 and 13, N channel MOSFETS (referred to as NMOS hereafter) 10, 11 and 14 and a resistor 12. A source of the PMOS 9 is grounded, a gate of the same is connected to the negative terminal of the secondary battery 4 and a drain of the same is connected to a drain and a gate of the NMOS 10. A source of the NMOS 10 is connected to the negative terminal of the solar battery 7. A source of the NMOS 11 is connected to the negative terminal of the solar cell 7, a gate of the same is connected to the drain of the NMOS 10 and a drain of the same is grounded through the resistor 12. A source of the PMOS 13 is grounded, a gate of the same is connected to the drain of the NMOS 11 and a drain of the same is connected to a drain of the NMOS 14. A source of the NMOS 14 is connected to the negative terminal of the solar cell 7 and a gate of the same is connected to the drain of the NMOS 10.

A switching circuit comprises an NMOS 15. A source of the NMOS 15 is connected to the negative terminal of the solar cell 7, a gate of the same is connected to the drain of the NMOS 14 and a drain of the same is grounded.

Now the circuit operation will be explained.

A seondary battery voltage and a solar cell voltage set with reference to a grounded point are respectively VSS and VSB.

(i) A voltage conversion circuit

In a voltage conversion circuit consisting of the PMOS 9 and the NMOS 10, a voltage across the source and drain (referred) to as VDS hereafter) $VDS_{10}$ of the NMOS 10 is represented by the formula (1).

$$VDS_{10} = \frac{K_9}{K_{10}}(V_{SS} - V_{TP}) + V_{TN} \quad (1)$$

where;

$V_{TN}$; a threshold voltage of the NMOS 10
$V_{TP}$; a threshold voltage of the PMOS 9
$K_9$; an electroconductive coefficient of the PMOS 9
$K_{10}$; an electroconductive coefficient of the NMOS 10

In the formula (1), the PMOS 9 is designed to operate in a saturable region. The formula (1) shows that the voltage across the source and drain $VDS_{10}$ of the NMOS 10 is independent of the solar battery voltage VSB.

(ii) An amplifying circuit

A variation of the VSS appears as an amplified voltage between terminals of the resistor 12 by an amplifying circuit consisting of the NMOS 11 and the resistor 12. A terminal voltage across the resistor 12 is represented by the formula (2).

$$VR = RK_{11} \times \frac{K_9}{K_{10}}(V_{SS} - V_{TP})^2 \quad (2)$$

where;

R; resistance value of the resistor 12
$K_{11}$; an electroconductive coefficient of the NMOS 11

(iii) An inverter

In the case the secondary battery voltage |VSS| is less than the predetermined value, an output electric potential of the inverter consisting of PMOS13 and NMOS14 is VSB, and in the case the secondary battery voltage |VSS| is more than the predetermined value, the output electric potential is at a grounded level. Namely, an inverter inverts the output signals depending on its input condition.

A condition to invert the output signals will be represented by the secondary battery voltage VSS in the formula (3).

$$|V_{SS}| = V_{TP} + \frac{1 + \sqrt{1 + 4n^2 RK_9 (V_{TP})}}{2nRK_9} \quad (3)$$

$$n = \sqrt{\frac{K_{13}}{K_9}}$$

Each element of the voltage detecting circuit for preventing the excess charging can be designed using the formula (3). Namely, an arbitrary secondary battery voltage can be detected by designing the value of electroconductive coefficients $K_9$ and $K_{13}$ of each MOSFET, the resistance value of the resistor 12 and the threshold voltage value $V_{TP}$ of the PMOS.

Although it is assumed that the detection voltage is out of the designed value by dispersion of the constants $K_9$, $K_{13}$ and VTP if the circuit is integrated, the resistance value can be selected according to the designed value of the detection voltage by designing the resistor 12 as an external part of an IC.

In the voltage detecting circuit is illustrated above, the output from the voltage detecting circuit is at a VSB potential (logical level "L") in the case the secondary battery voltage is less than a setting value given by the formula (3), and at a ground potential (logical level "H") in the case the secondary battery voltage is more than the setting value given by the formula (3).

The switching circuit 15 is controlled by the output signal of the voltage detecting circuit and assumes the conduction or non-conduction conditions. Namely, when the secondary battery is in the excess charge condition and the terminal voltage exceeds the setting value represented by the formula (3), the output signal of the voltage detecting circuit changes to "H" level, and the NMOS 15 is in the conduction condition receptive of the output signal. On this occasion a charging current in the solar cell 7 is by-passed by the NMOS 15 and the charge to the secondary battery 4 is stopped. If the secondary battery is not in the excess charge condition and the terminal voltage VSS is less than the setting value, the output signal from the voltage detecting circuit is at the logical level "L" and the NMOS 15 is in the nonconducting condition, thereby the secondary battery can be charged.

Figure 3:
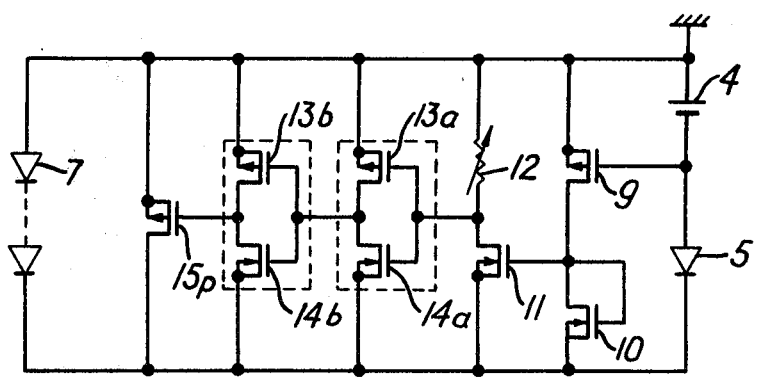
FIG. 3 shows another embodiment of the charge control circuit according to the present invention.

FIG. 3 shows another embodiment of the charge control circuit.

In FIG. 3, a switching circuit comprises a PMOS 15p and the inverter of the excess charge detecting circuit comprises a first CMOS inverter comprised of PMOS 13a and NMOS 14a, and a second CMOS inverter comprised of PMOS 13b and NMOS 14b.

The circuit structure and the operation of the charge control circuit according to the present invention have been illustrated hereinabove. In the charge control circuit according to this invention, since the voltage detecting circuit of the secondary battery is driven by the voltage of the solar cell, the secondary battery does not consume energy on detecting the voltage, so that the energy accumulated in the secondary battery in used effectively.

It is to be noted that although a solar cell and a silver-zinc battery are respectively used for the power device and the secondary battery, other power devices and secondary batteries may be used as well. For the power devices, a thermo power, a magnetic power utilizing rotation-force and an atomic power may be used. On the other hand for the secondary batteries, an oxide mercury battery, a nickel-cadmium battery and a lithium battery may be used. It is possible to prevent the excess charging of these secondary batteries by suitably setting the respective charge control voltages.

As illustrated hereinbefore, the charge control circuit according to the present invention provides a highly reliable and safe charging system in which the excess charging can be detected at lower power consumption, the charging efficiency is excellent and the circuit can be easily integrated into an IC. Consequently, lives of small portable electronic instruments such as electronic wristwatches and computers can be extended.

What is claimed is;

1. A charge control circuit comprising: an excess charge detecting circuit and a charge changeover circuit of a secondary battery operated by an electromotive force of a power device, said excess charge detecting circuit being connected between a first line connected to both a positive terminal of said power device and a positive terminal of said secondary battery and a second line connected to a negative terminal of said power device, said excess charge detecting circuit comprising a first stage having a source of a first P channel MOSFET connected to the first line, a gate thereof connected to a negative terminal of the secondary battery and a drain thereof connected to both a drain and a gate of a first N channel MOSFET connected to the second line, a second stage having a source of a second N channel MOSFET connected to the second line, a gate thereof connected to the drain of the first N channel MOSFET and a drain thereof connected to the first line by way of a resistor, and a third stage having a source of a second P channel MOSFET connected to the first line, a gate thereof connected to the drain of the second N channel MOSFET, a drain thereof connected to a drain of a third N channel MOSFET, a gate of the third N channel MOSFET connected to the drain of the first N channel MOSFET and a source of the third N channel MOSFET connected to the second line.

2. A charge control circuit as claimed in claim 1, wherein said charge changeover circuit comprises an N channel MOSFET for selecting either a conduction or non-conduction condition by an output signal from said excess charge detecting circuit.

* * * * *